Nov. 10, 1959             G. C. WEBB             2,911,732
APPARATUS FOR DEHYDRATION OF COMESTIBLES
Filed Jan. 11, 1957             4 Sheets-Sheet 1
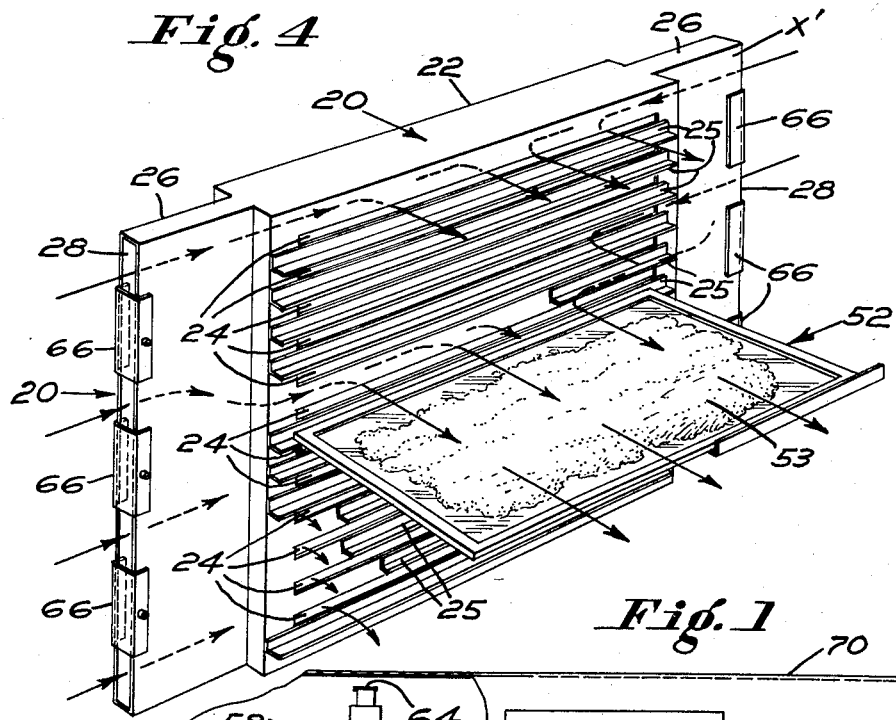
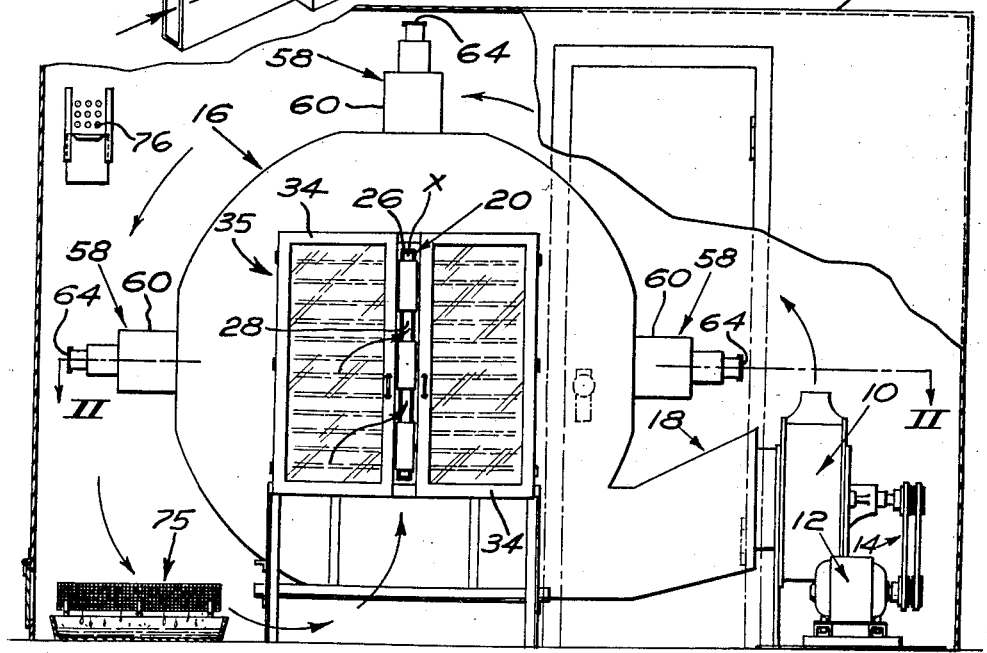
INVENTOR:
GEORGE C. WEBB
BY
Beau, Brooke, Buckley & Beau,
ATTORNEYS.

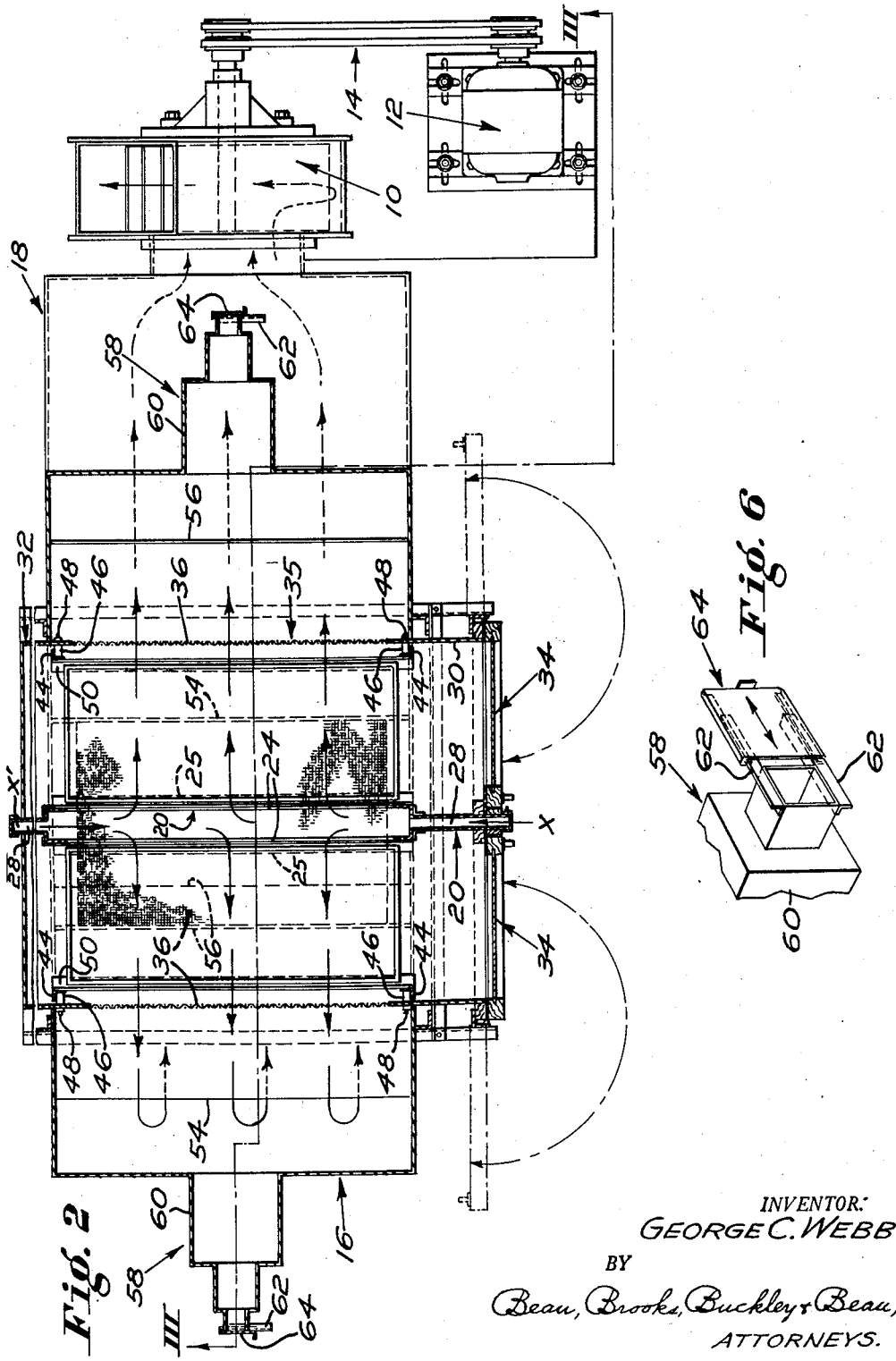

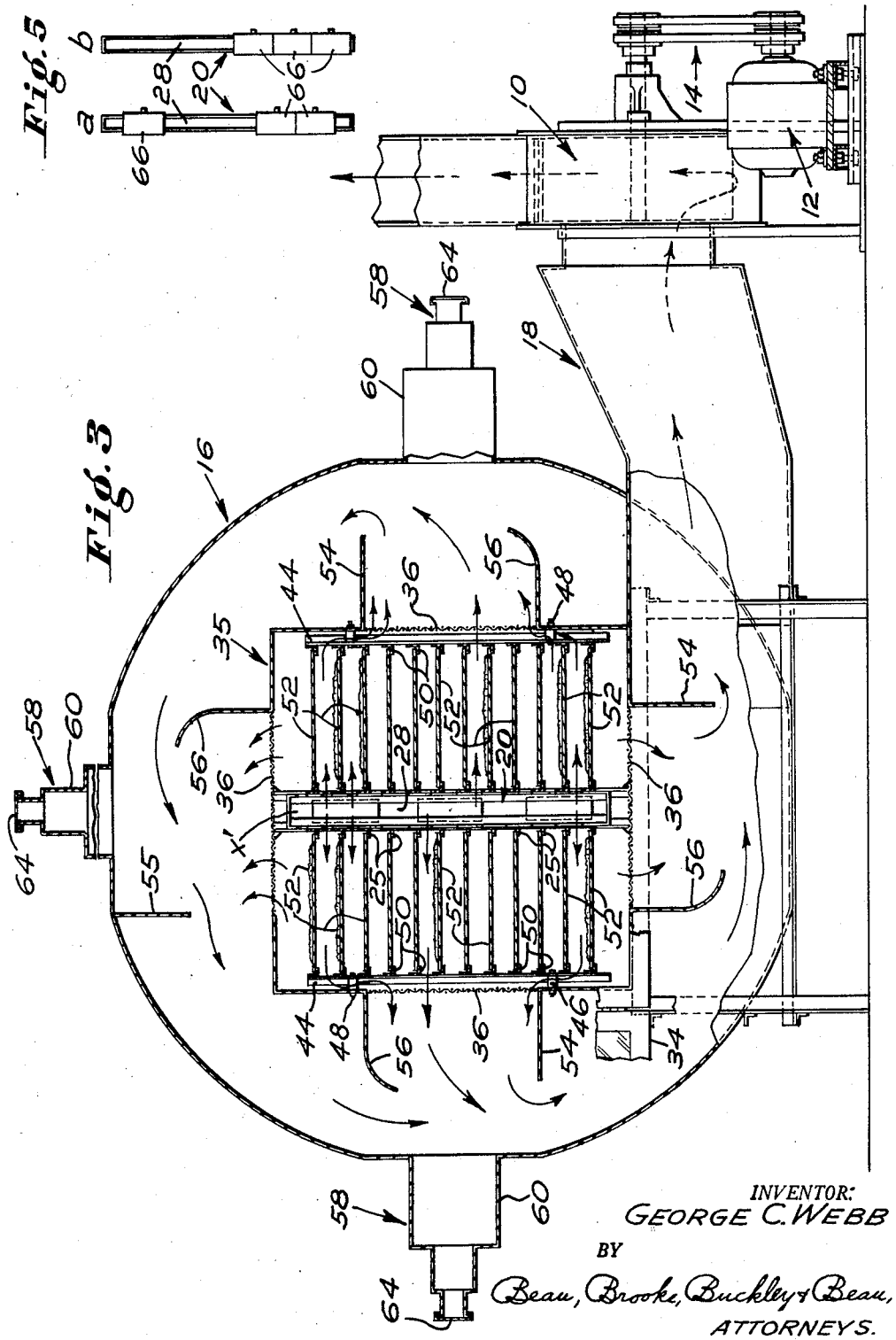

Nov. 10, 1959  G. C. WEBB  2,911,732
APPARATUS FOR DEHYDRATION OF COMESTIBLES
Filed Jan. 11, 1957  4 Sheets-Sheet 4

INVENTOR:
GEORGE C. WEBB
BY:
Beau, Brooks, Buckley & Beau,
ATTORNEYS.

United States Patent Office 2,911,732
Patented Nov. 10, 1959

2,911,732

APPARATUS FOR DEHYDRATION OF COMESTIBLES

George C. Webb, Tonawanda, N.Y.

Application January 11, 1957, Serial No. 633,760

8 Claims. (Cl. 34—193)

This application is a continuation-in-part of U.S. patent application Serial No. 410,750, filed Feb. 17, 1954, titled "Dehydrator Apparatus," now abandoned.

The invention relates to the art of drying or dehydrating organic substances such as are found in nature, when it is desirable to dehydrate the same to preserve them against deterioration such as during temporary storage or other handling, prior to their subsequent reconstitution by addition of water or other processing preliminary to their intended ultimate use. Such methods are useful in connection, for example, with the processing of comestibles including fruits, vegetables, meats, and the like; as well as other water-containing substances such as wood, human or animal blood, and the like.

It is a primary object of the present invention to provide an improved method for dehydrating such aforesaid products, at least to sufficient degree to give such products satisfactory "shelf-life" for commercial purposes, prior to reconstitutioning thereof.

Another object of the invention is to provide an improved method of dehydrating as aforesaid which incidental to dehydration involves minimized loss of the essential "aromatic" volatiles, whereby upon reconstitutioning of the product it is restored to substantitally natural condition with respect to structure, texture, flavor, and the like.

Another object of the invention is to provide a novel process for the purpose hereinabove referred to which contemplates constant recirculation of volatile substance vapors through the solid substances of the material being treated and substantial reabsorption by the solids of such aromatic constituents accompanied by a gradual bleeding-off of substantially only the water vapors to the discharge.

Another object of the invention is to provide a novel apparatus adapted to perform the method of the invention as hereinabove described.

Another object of the invention is to provide improved air inlet and distribution means in apparatus of the aforesaid type.

Another object of the invention is to provide improved means for supporting materials to be dried on shelves or trays in spaced relation in association with inlet air distribution means as aforesaid, whereby uniformly improved dehydration of the materials is accomplished.

Still another object of the invention is to provide adjustable valve means of novel form in a dehydrator apparatus of the aforesaid type whereby air-flow patterns internally of the apparatus may be selectively directed and controlled.

Still another object of the invention is to provide a dehydrator apparatus of the aforesaid type which is easily loaded and unloaded and readily accessible for cleaning, or other servicing, or the like.

And, still another object of the invention is to provide a dehydrator apparatus of the aforesaid type which is relatively inexpensive to fabricate and operate.

Further objects and advantages of the invention will appear in the specification hereinafter.

In the drawing:

Fig. 1 is a front elevational view of an apparatus for performing the invention, with a portion of the apparatus enclosure partially broken away;

Fig. 2 is an enlarged sectional view taken on the line II—II of Fig. 1;

Fig. 3 is a partly sectional view taken on the line III—III of Fig. 2;

Fig. 4 is a perspective view showing a detail of the construction of Figs. 1–3;

Fig. 5 is a duplicate fragmentary end elevational view of the detail illustrated in Fig. 4 showing the air blocking vanes in various positions of adjustment thereof;

Fig. 6 is a fragmentary perspective view showing another detail of the construction;

Figure 7:
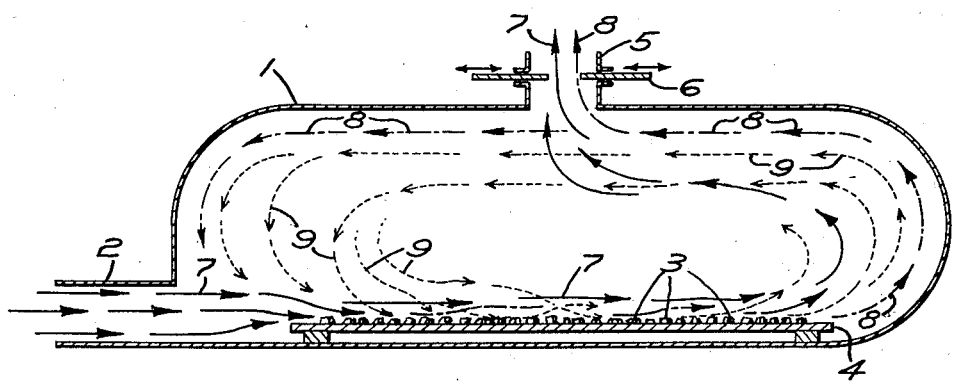
Fig. 7 is a schematic illustration of the operative principle of the invention.
Figure 8:
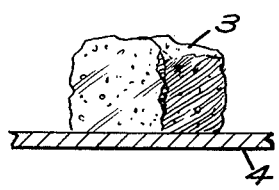
Fig. 8 illustrates the condition of a fragment of material prior to processing in accord with the invention.

The invention contemplates generally a dehydration process designed specifically to provide a "dehydrated" product from which a satisfactory percentage of the natural water content has been subtracted while retaining substantially the original content of "aromatic" or non-water volatile constituents, and its original structural and texture characteristics. Hence, when the material is reconstituted by subsequent addition of water, or is otherwise processed, it will possess substantially its original components in natural form. Furthermore, the invention contemplates a process as aforesaid which employs no heat, such as would otherwise deleteriously affect the flavor or other natural characteristics of the material.

Whereas previously in the food product dehydration art, for example, efforts have been directed largely toward rapid and inexpensive evaporation methods for economic reasons, they therefore employed relatively large volume air blasts and heat applications and emphasized rapid removal of moisture bearing air from the regions of contact with the material being processed. Such prior art methods are today in wide use and are relatively cheap and provide quick drying results; but in the case of many products the results so obtained are not acceptable because heating of the product invariably changes the flavor producing or other components thereof; and also because such processes of the prior art invariably involve substantial loss of the "aromatic" volatiles constituents of the material under treatment, along with the water content thereof.

The present invention involves a new concept based upon the discovery that the solid constituents and the "aromatic" volatile constituents of nature's products possess stronger inherent affinities for each other than for the water contents thereof when volatilized. Accordingly, the method of the present invention contemplates initially subjecting the material to be processed to a dry air stream directed against the material to be processed, in such manner as to absorb from the material the requisite proportion of the water content thereof through volatilization of the latter, while initially retaining captive the air stream which incidentally will have also absorbed the valuable "aromatic" volatiles from the material being processed. This air stream is then recirculated in contact with the material under treatment, thereby providing opportunity for the "aromatic" volatiles to be filtered back into the solid constituents of the material, while the water vapor content of the air stream substantially continuously passes on, and is gradually bled away from the circulation system.

Hence, a substantial segregation of the water vapor and the "aromatic" volatile contents of the air stream is affected; and the "aromatic" volatiles of the processed materials are substantially restored to the solid constituents thereof. It is a particular feature that the effect thus described is obtained without application of heat whereby the finished product is undamaged flavor-wise, and whereby the material may be subsequently reconstituted by simple addition of water into a form more nearly resembling the original product of nature than may be obtained by processes of the prior art.

Figure 9:
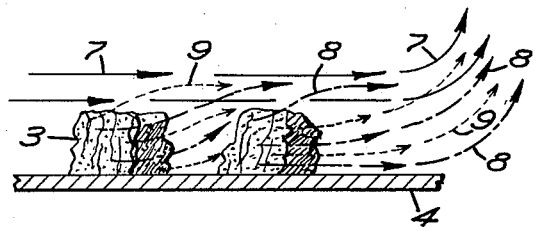
Figs. 9–10 illustrate schematically the action imposed upon the fragment of Fig. 8 in accord with the invention.
Figure 10:
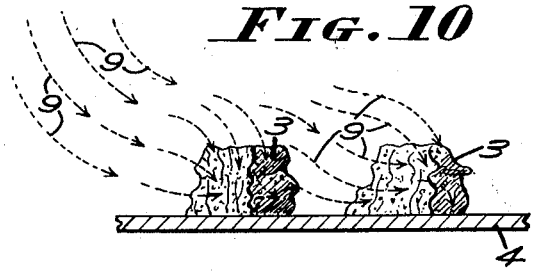

Referring now to the drawing, Figs. 7–10 illustrate schematically operation of the process of the invention. Fig. 7 illustrates schematically an apparatus of the invention wherein a casing 1 is provided to include an inlet port 2 through which a current of fresh air from externally of the apparatus is caused to move into the casing 1 and through the material to be treated, such as is illustrated for example in Fig. 7 as comprising a supply of chopped solid materials 3 mounted on a support tray 4. Casing 1 is also provided with an air outlet port 5, which is arranged to be throttled by means of a valve device 6 for regulation of the bleed-off air entraining water vapors extracted from the feed material pieces 3, as will be explained hereinafter. The casing 1 is shaped so as to cause the air currents entering the casing to continuously recirculate in water vapor extracting relation with respect to the material pieces 3. Thus, as illustrated in Figs. 7 and 9, the currents of air designated 7 move initially into contact with the material pieces 3 so as to extract therefrom the natural water content thereof, whereupon the water bearing air currents are illustrated in the drawing at 8. Simultaneously, the air currents extract from the material pieces 3 the aromatic volatile constituents thereof as indicated at 9; and the combined air currents carrying water vapor and volatile aromatics extracted from the material being processed are constantly recirculated within the casing as illustrated in Fig. 7. Thus, the aromatic volatile carrying air currents as indicated at 9 are continuously recirculated relative to the material being processed, and is illustrated diagrammatically in Fig. 10, these currents operate to restore the aromatic volatiles to the solid constitutents of the material being processed. As explained hereinabove, it is by virtue of the discovery that the aromatic volatile constituents of the feed material have a naturally stronger affinity for the solid constituents thereof than does the water content of the natural material, that segregation of the water constituents of the feed material is hereby obtained. The discharge orifice 5 of the apparatus is regulated as to size by means of the valve device 6, so as to permit only a gradual bleeding of vapor carrying air currents interiorly of the casing, as indicated at the top portion of Fig. 7; whereas in the meantime, due to constant recirculation of the air currents within the casing, the aromatic constituents of the feed material have been substantially restored to the feed material. Hence, a substantial extraction of the water content of the feed material is obtained while experiencing only a minimum loss of aromatic contents thereof.

The embodiment of the apparatus of the invention shown in Figs. 1–6 of the drawing is illustrated to employ a rotary exhaust or pressure fan 10 driven by a motor 12 through a V-belt and pulley means as indicated generally at 14 (Figs. 1, 2 and 3). As indicated in the drawing the fan inlet is connected through an air duct 18 to the dehydrator housing 16, for the purpose of exhausting air therefrom as will be explained more fully hereinafter. It is a particular feature of this form of the invention that the dehydrator housing embodies an inlet air duct of novel form as indicated at 20 and illustrated in detail in Fig. 4. The duct device 20 is assembled prior to installation in the housing 16 and comprises generally a rectangular hollow body portion 22 having its opposite side walls formed with a plurality of parallel slots 24. Support runners 25 formed of angle irons are fixed intermediate the slots for support of material-laden trays as will be explained hereinafter. The duct device 20 is formed with reduced opposite end portions 26—26 terminating in air inlet slots or openings 28—28. The air duct device 22 is constructed to be of sufficient length to span the width of the central body portion of the housing 16 which includes outwardly protruding end portions 30—32. Thus the air inlet slots 28—28 are disposed externally of the housing 16. As shown in Figs. 1–2, a pair of access doors 34—34 are preferably suitably hinged to the housing at opposite sides of the air intake slots 28—28, and are arranged to swing away from each other and outwardly to permit loading and unloading of the apparatus, while in the interim being in substantially air-sealing relation over the access openings. While such access doors have been shown and described as being applied to only one side of the housing, it will of course be appreciated that such doors may if preferred be also arranged in the same manner on the opposite side thereof, to facilitate insertion and removal of materials and cleaning, or the like.

The walls of the protruding portions 30—32 extend inwardly of the abutment thereof with the faces of the dehydrator housing, thereby providing a substantially cubical shaped material container housing 35 between the opposite walls of the outer dehydrator housing 16. The sides of the housing 35 are cut away and supplanted by screen panels 36. Corner post members 44 are fixed by means of spacer members 46 and bolts 48 to the vertical sides of the housing 35 in the corners thereof (Figs. 2 and 3), and then a plurality of angle support runners 50 similar to the runners indicated at 25 are fixed to the vertical members 44 in spaced relation thereon at horizontal levels corresponding to the levels of the runners 25.

Thus, a plurality of material supporting shelves or trays 52 are supported in sliding relation between rows of the support runners 25 and 50, and are adapted to be readily loaded and unloaded from the housing 35. It will be understood that the trays 52 may be of any preferred construction. For example, they may be made of fine mesh screen, or the like, to facilitate dehydration of materials carried thereon as indicated at 53 (Fig. 4), or the trays may be made of sheet glass or wood or metal, or the like.

The housing 16 is vortex-shaped as shown in Figs. 1, 3 with the air inlet slots 28—28 disposed at the center thereof, and thus it will be understood that upon operation of the fan 10 air will be drawn into the slots 28—28 and centrally through the device 20, and thence out through the slots 24 and over the trays 52 and thence through the screens 36 into the circular path of travel inside the housing 16 as shown by the arrows (Figs. 2–3) and thence out through the duct 18 to the fan 10.

It is another feature of the invention to provide a plurality of baffle plates of the type illustrated in Fig. 3 at 54, 55 and 56 fixed at points inside of the housing 16 in the manner shown to direct the air-flow patterns therethrough along the directions indicated by the arrows therein. Furthermore, it is also a feature of the invention to provide a plurality of peripherally spaced supplemental air inlet valves 58 which are adapted to selectively admit air at selected volumetric proportions therethrough whereby further control may be exercised to control the air-flow patterns inside the device.

The air inlet valves 58 each comprise generally a rectangularly stepped box-like portion 60 based upon the housing 16 and communicating with the interior thereof (Figs. 1, 2 and 3). A pair of parallel runners 62—62 are fixed to the outer open end of the body portion 60 (Fig. 6) to slidably guide a cover member 64 thereon in various positions of adjustment to regulate the quantities of air drawn into the housing 16 as the fan operates.

It is still another feature of the invention as illustrated in the drawing to provide a plurality of valve plate members 66 in adjustable sliding arrangement over the inlet ends of the slots 28—28 of duct 22, in order that such valve members may be adjusted such as shown in the composite view of Fig. 5 for selectively controlling the direction of travel of inflowing currents of air coming into the dehydrator housing 16.

Thus, it will be appreciated that the flow of air over the trays or shelves 52 may be meticulously controlled so that materials contained in the trays may be more uniformly and efficiently dehydrated with improved facility and in strict accordance with the treatment prerequisite to best results in any given instance.

Whereas the apparatus hereinabove described may be employed alone whereby the air drawn in at the slots 28—28 is fresh air from the outside atmosphere and whereby the fan 10 discharges to the outside atmosphere, the housing 16 and fan 10 may if preferred be installed within an outer casing as indicated at 70 (Fig. 1). Thus, the same supply of air within the casing 70 is circulated and recirculated through the housing 16 and the fan 10; the moisture picked up by the circulating air being constantly caught in a dehydrating cartridge of calcium chloride or the like as indicated at 75. Provision for inlet of minor air replenishment supplies may be made as indicated at 76; but in any case it will be understood that the novel air flow control features of the duct unit 20 and the valves 58 and the baffles 54, 55, 56 will provide improved dehydration performance.

It will of course be understood that the apparatus of the invention may operate with equal facility by arranging the fan 10 to operate in reverse; that is, to force air into the duct 18 for reverse flow through the material drying apparatus. Thus, although only one form of the invention has been shown and described in detail, it will be apparent to those skilled in the art that the invention is not so limited but that various changes may be made therein without departing from the spirit of the invention or the scope of the appended claims.

I claim:

1. A dehydrator apparatus comprising a drum-shaped housing having opposed side walls, air exhaust means communicating with the interior of said housing at a peripheral portion thereof, air inlet duct means comprising a box-like casing extending transversely through said housing and having its opposite ends open and communicating with the ambient atmosphere at opposite sides of said housing, said duct means having a plurality of spaced slots in the side walls thereof communicating with the interior of said housing, and means supporting a plurality of shelves in spaced relation at opposite sides of said air inlet duct means adjacent said slots, whereby air is drawn into said inlet duct means and thence uniformly across said shelves and thence outwardly and around the inside peripheral wall of said housing and thence into said air exhaust means.

2. A dehydrator apparatus for drying materials comprising a generally drum-shaped housing having opposed flat side walls and a cylindrical shaped peripheral wall, air inlet port means comprising vertical slots in the side walls of said housing, air outlet means communicating with the interior of said housing through an apertured portion of said peripheral wall, material support means comprising a box-like structure disposed centrally within said housing in spaced relation to said peripheral wall, a manifold air duct device of narrow vertically extended form disposed transversely through said box-like structure and having its opposite ends in open communication with said inlet port means and the ambient atmosphere externally of said housing, said duct device having a plurality of vertically spaced slots in the side walls thereof communicating with the interior of said housing, means for mounting a plurality of material holding shelves in vertically spaced relation within said box-like structure at opposite sides of said air duct device in line with said slots, the top, bottom, and end walls of said box-like structure being apertured, and air circulation means whereby air is drawn into said inlet port means and then flows through said manifold air duct device and thence in diverse paths through the shelf support areas of said structure and thence outwardly into the space between said box-like structure and said peripheral wall whereupon it assumes a circular flow path around the inside surface of said peripheral wall of said housing and thence out through said air outlet means.

3. A dehydrator apparatus for drying materials comprising a generally drum-shaped housing having opposed flat side walls and a cylindrical shaped peripheral wall, air outlet means communicating with the interior of said housing at an apertured portion of said peripheral wall, material support means comprising a skeleton type frame structure extending transversely within the center portion of said housing and having air inlet duct means at its opposite ends in open communication with the ambient atmosphere at opposite sides of said housing, said frame structure being arranged to support a plurality of material holding shelves in spaced relation at opposite sides of said air inlet duct means and air circulation means whereby air is drawn into said inlet duct means and then flows across and between said shelves and thence into the space around the inside surface of said peripheral wall of said housing and thence out through said air outlet means.

4. A dehydrator apparatus for drying materials comprising a generally drum-shaped housing having opposed flat side walls and a cylindrical shaped peripheral wall, air exhaust means communicating with the interior of said housing at an apertured portion of said peripheral wall, material support means comprising a skeleton type frame structure extending transversely within the center portion of said housing and having air inlet duct means at its opposite ends in open communication with the ambient atmosphere at opposite sides of said housing, auxiliary air inlet ports through the peripheral wall of said housing at intervals therearound for modifying the air flow currents therein, said frame structure being arranged to support a plurality of material holding shelves in spaced relation at opposite sides of said air inlet duct means whereby upon operation of said air exhaust means air is drawn into said inlet duct means and then flows across and between said shelves and thence into the space around the inside surface of said peripheral wall of said housing and thence out through said air exhaust means.

5. A dehydrator apparatus for drying materials, comprising a housing having access means adapted to be pressure-sealed, air outlet means communicating with said main housing portion, air inlet duct means extending substantially centrally through said main housing and communicating at its opposite ends with the ambient atmosphere externally of said housing and having a plurality of spaced air slots communicating with the interior of said housing, means for mounting a plurality of material supporting shelves adjacent the slotted portions of said duct means, and air circulation means arranged to cause air to be passed through said inlet duct means and thence across and between said shelves and thence out through said air outlet means, auxiliary air inlet means disposed at the top and end perimetral portions of said housing and each comprising a stepped progressively decreased sectional area rectangular duct terminating in an air inlet port having adjustable valve means thereon for modifying the air flow currents inside said housing, and baffle plate means interiorly of said housing for guiding the air flow therein.

6. A dehydrator apparatus for drying materials, comprising a housing having access means adapted to be pressure-sealed, air outlet means communicating with said main housing portion, air inlet duct means extending substantially centrally through said main housing and communicating at its opposite ends with the ambient atmosphere externally of said housing and having a plurality of spaced air slots communicating with the interior of said housing, means for mounting a plurality of material supporting shelves adjacent the slotted portions of said duct means whereby upon operation of said outlet means air will be drawn through said inlet duct means and thence across and between said shelves and thence out through said air outlet means, and auxiliary air inlet means disposed at the top and end perimetral portions of said housing and each comprising a stepped progressively decreased sectional area rectangular duct terminating in an air inlet port having adjustable valve means thereon.

7. A dehydrator apparatus comprising a drum-shaped housing having opposed side walls, air circulation means communicating with the interior of said housing at a peripheral portion thereof, air duct means comprising a box-like casing extending transversely through said housing and having its opposite ends open and communicating with the ambient atmosphere at opposite sides of said housing, said duct means having a plurality of spaced slots in the side walls thereof communicating with the interior of said housing, and means supporting a plurality of shelves in spaced relation at opposite sides of said air duct means adjacent said slots, whereby air is circulated through said inlet duct means and uniformly across said shelves and around the inside peripheral wall of said housing and through said air exhaust means.

8. A dehydrator apparatus for drying materials comprising a generally drum-shaped housing having opposed flat side walls and a cylindrical shaped peripheral wall, air port means communicating with the interior of said housing at an apertured portion of said peripheral wall, material support means comprising a skeleton type frame structure extending transversely within the center portion of said housing and having air duct means at its opposite ends in open communication with the ambient atmosphere at opposite sides of said housing, said frame structure being arranged to support a plurality of material holding shelves in spaced relation at opposite sides of said air duct means and air circulation means whereby air is circulated through said inlet duct means and across and between said shelves and through the space around the inside surface of said peripheral wall of said housing and through said air port means.

References Cited in the file of this patent

UNITED STATES PATENTS

| | | |
|---|---|---|
| 539,874 | Mayo et al. | May 28, 1895 |
| 1,399,692 | Curtis | Dec. 6, 1921 |
| 1,588,298 | Booksh | June 8, 1926 |
| 2,017,728 | Oskamp | Oct. 15, 1935 |
| 2,166,467 | Goodhue | July 18, 1939 |
| 2,473,184 | Webb | June 14, 1949 |
| 2,541,859 | Gallaghan et al. | Feb. 13, 1951 |